United States Patent
Bechon et al.

(10) Patent No.: US 9,862,233 B2
(45) Date of Patent: Jan. 9, 2018

(54) HEAVY TRUCK TIRE FOR A TRAILER VEHICLE

(75) Inventors: Hervé Bechon, Clermont-Ferrand (FR); Benoit Foucher, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 771 days.

(21) Appl. No.: 13/989,567

(22) PCT Filed: Nov. 24, 2011

(86) PCT No.: PCT/EP2011/070970
§ 371 (c)(1),
(2), (4) Date: Sep. 10, 2013

(87) PCT Pub. No.: WO2012/069603
PCT Pub. Date: May 31, 2012

(65) Prior Publication Data
US 2013/0340905 A1     Dec. 26, 2013

(30) Foreign Application Priority Data

Nov. 25, 2010   (FR) ..................... 10 59708

(51) Int. Cl.
*B60C 11/00* (2006.01)
*B60C 9/18* (2006.01)
*B60C 11/03* (2006.01)

(52) U.S. Cl.
CPC ............... *B60C 9/18* (2013.01); *B60C 11/00* (2013.01); *B60C 11/005* (2013.01);
(Continued)

(58) Field of Classification Search
CPC ............... B60C 11/005; B60C 11/0075; B60C 11/0058; B60C 11/0066; B60C 11/0304
(Continued)

(56) References Cited

U.S. PATENT DOCUMENTS 4,619,300 A    10/1986   Tokunaga et al.
5,360,043 A *  11/1994   Croyle ................ B60C 11/0304
                                                152/209.28
(Continued)

FOREIGN PATENT DOCUMENTS

DE          3815829     * 12/1988
EP     1 236 587 A2       9/2002
(Continued)

OTHER PUBLICATIONS

English machine translation of DE3815829, dated Dec. 1988.*
(Continued)

*Primary Examiner* — Robert Dye
(74) *Attorney, Agent, or Firm* — Dickinson Wright PLLC

(57) ABSTRACT

A tire having a carcass reinforcement surmounted radially by a crown reinforcement having at least two working plies, the width Lt of which is equal to the width of the axially narrowest working ply, and surmounted radially by a tread (or "cap") and interposed radially between the cap and the crown reinforcement by a sublayer (or "base"), this base extending axially and radially under all of the cap and radially on the outside of the crown reinforcement over a total width at least equal to the width Lt of the crown reinforcement, an equatorial plane dividing the cap axially into an outer half cap (TE) and an inner half cap (TI) of the same axial width, the outer half cap (TE) positioned axially towards the outside of a vehicle and the inner half cap (TI) positioned axially towards the inside of the vehicle, the base comprising an additional volume radially under the inner
(Continued)

half cap (TI), such that the volume occupied by the base radially under the inner half cap (TI) is greater than the volume occupied by the base radially under the outer half cap (TE), and the material of the base is a rubber-based composition having hysteresis lower than the hysteresis of the rubber-based material of the cap.

11 Claims, 2 Drawing Sheets

(52) U.S. Cl.
CPC ........ B60C 11/0075 (2013.01); B60C 11/032 (2013.01); B60C 11/0304 (2013.01); B60C 11/0323 (2013.01); B60C 2011/0025 (2013.01); B60C 2200/06 (2013.01)

(58) Field of Classification Search
USPC ....................................................... 152/209.5
See application file for complete search history.

(56) References Cited

U.S. PATENT DOCUMENTS

| 5,622,575 | A | * | 4/1997 | Meyer-Adlung | ....... B60C 11/00 152/209.16 |
| 2004/0211501 | A1 | * | 10/2004 | Kajita | ................. B60C 11/0306 152/209.15 |
| 2010/0154949 | A1 | * | 6/2010 | Nagai | ....................... B60C 3/06 152/209.5 |
| 2010/0294410 | A1 | * | 11/2010 | Yoshikawa | ........... B60C 9/2006 152/454 |

FOREIGN PATENT DOCUMENTS

| EP | 2 154 007 A1 | 2/2010 |
| JP | 2-162104 A | 6/1990 |

OTHER PUBLICATIONS

International Search Report (PCT/ISA/210) dated Jan. 23, 2012, by the European Patent Office as the International Searching Authority for International Application No. PCT/EP2011/070970.

\* cited by examiner

COUPE SELON IV-IV

HEAVY TRUCK TIRE FOR A TRAILER VEHICLE

FIELD OF THE INVENTION

The present invention relates to tires for heavy vehicles and more particularly to tires for vehicles of the trailer type.

PRIOR ART

As is known, a tire for a heavy vehicle and notably for a trailer, comprises a carcass reinforcement anchored in beads, these beads being intended to be in contact with a mounting rim. The carcass reinforcement is surmounted radially on the outside by a crown reinforcement usually made up of a plurality of reinforcing plies (referred to as "working plies" in as much as they contribute to absorbing the forces resulting notably from the inflating of the tire). This crown reinforcement is surmounted radially on the outside by a tread or cap intended to come into contact with a roadway during driving. Furthermore, it is known practice to position a layer of rubber radially between the cap and the crown reinforcement (referred to as a "sublayer" or "base"). This base covers at least the ends axially on the outside of the crown reinforcement and may extend as far as the equatorial plane of the tire.

The base referred to does not form part of the cap as such, which means to say that it does not serve as a wearing layer during running, but is positioned between the crown reinforcement and the cap near the ends of the crown reinforcement. It is known that the end region of the plies is subject to deformations that lead to heating in the nearby materials. In order to limit the increase in temperature near the ends of the plies, a base made of a material which has lower hysteresis than the material of which the cap is made is positioned radially on top of the said plies. Thanks to this lower hysteresis, the amount of energy dissipated in the form of heat radially on top of the axial ends of the crown reinforcement is reduced by comparison with the heat dissipated with the same cap directly in contact with the said crown reinforcement. The most sensitive region, which means to say the region where the temperature rise is the most pronounced as it is near the end of the axially narrowest working ply is the one that receives a maximum thickness of base. At the same time, the base protects the crown reinforcement against attack and oxidation.

The temperature of the crown reinforcement near its axially outside ends can be adjusted by altering the thickness of the base at these ends; what is meant in the present description by the thickness of the base is a thickness of material measured over the end of the working ply that is axially the shortest.

In manufacture, a base is generally formed by combining it with the cap using a coextrusion process.

Definitions:

A block is a raised element formed on the cap which is delimited by voids or grooves and comprises lateral walls and a contact face intended to come into contact with the roadway. A rib is a raised element delimited by two grooves running in the same direction; a rib comprises two lateral walls and a contact face.

In the present document, a radial direction means a direction which is perpendicular to the axis of rotation of the tire (this direction corresponds to the direction of the thickness of the tread).

An axial direction means a direction parallel to the axis of rotation of the tire.

A circumferential direction means a direction perpendicular both to the axial direction and to a radial direction; this circumferential direction is tangential to a circle centered on the axis of rotation.

Axially on the outside means a direction directed towards the outside of the internal cavity of the tire.

Equatorial plane is a plane perpendicular to the axis of rotation and passing through the axially outermost points of the tire; this equatorial plane virtually divides the tire into two substantially equal halves.

Axially towards the inside of a cap of a tire: corresponds to the side of the cap which, when the tire is mounted on an axle of a heavy vehicle, faces towards the vehicle.

BRIEF DESCRIPTION OF THE INVENTION

It has been found that tires for heavy vehicles of the trailer type (which means to say vehicles the axles of which are essentially load-bearing axles rather than steered axles), the caps of which have been formed of a single material may, during use, show damage near the edge of the crown reinforcement situated axially towards the inside of the tire. This potential damage has been linked to a higher operating temperature on this inside: indeed it has been found that there is a difference of the order of three degrees Celsius between the inside and the outside of the same tire when running on a vehicle of the trailer type.

The present invention seeks to propose a tire for a vehicle of the heavy trailer type, the structure of which is less sensitive to this type of stress in use and that allows this type of damage to be avoided.

To this end, the subject of the invention is a tire intended to be fitted to a heavy vehicle of the trailer type, this tire comprising a carcass reinforcement surmounted radially on the outside by a crown reinforcement comprising at least two working plies, the width Lt of this crown reinforcement being equal to the width of the axially narrowest working ply, this crown reinforcement being surmounted radially on the outside by a tread (also known as a "cap") formed of a first rubber-based composition and interposed radially between the said cap and the crown reinforcement by a sublayer (also known as a "base"), formed of a second rubber-based composition: this base extending axially and radially under all of the cap and radially on the outside of the crown reinforcement over a total width at least equal to the width Lt of the crown reinforcement, an equatorial plane dividing the cap axially into an outer half cap and an inner half cap of the same axial width, the outer half cap being intended to be positioned axially towards the outside of a vehicle and the inner half cap being intended to be positioned axially towards the inside of the said vehicle. Further, the cap has a thickness E and comprises a tread surface intended to come into contact with a roadway. This cap is provided in the new state with an asymmetric tread pattern over at least a thickness equal to 30% of the thickness E of the cap, so as to confer greater mechanical stiffness on the outer half cap (TE) by comparison with the inner half cap (TI). This tire is characterized in that it comprises an additional volume of base radially under the inner half cap so that the volume occupied by the base radially under the inner half cap is greater than the volume occupied by the base radially under the outer half cap, and in that the second composition of which the base is made is a composition that has a hysteresis lower than the hysteresis of the first composition of which the cap is made.

The additional volume of base is distributed evenly and consistently all around the tire.

An "asymmetric tread pattern over at least a thickness equal to 30% of the total thickness E of the cap" should be understood here as meaning that the cap is provided in the new state with tread patterns that differ according to the side considered (inside or outside), this asymmetric tread pattern being present over at least a thickness of 30% of the total thickness of the cap. In order to differentiate the mechanical stiffness of the outer half cap (TE) by comparison with that of the inner half cap (TI) it is possible notably to differentiate between the groove-void ratios of each of said half caps: by increasing the volume of voids in one half cap the mechanical stiffness of this half cap is reduced. Mechanical stiffness here means the stiffness of each half cap subjected to transverse stressing (parallel to the axis of rotation), notably under cornering.

This cap is provided in the new state with an asymmetric tread pattern over at least a thickness equal to 30% of the thickness E of the cap so as to confer greater stiffness.

Thanks to the cap according to the invention, it is possible to adapt the temperature level in use in the edge regions and notably in the region situated on the inside by adapting the volume of base axially at the axial end of the shorter working ply.

Remember that the hysteresis of a composition is a recognized indication of the rolling resistance of tires: in particular, a composition that has a low hysteresis is considered to be synonymous with lower rolling resistance for the tires containing this composition, and therefore to be synonymous with a reduction in energy consumption of the vehicles fitted with such tires. The rolling resistance of a tire is a measure of the amount of energy that has to be supplied to a tire in order to set it in motion on a roadway.

The dynamic properties $\Delta G^*$ and $\tan(\delta)_{max}$ of a rubber composition are measured on a viscoanalyzer (Metravib VA4000) in accordance with standard ASTM D 5992-96. The response of a test specimen of vulcanized composition (cylindrical test specimen 4 mm thick and 400 mm² in cross-sectional area), subjected to simple alternating sinusoidal shear stress at a frequency of 10 Hz at 60° C. is recorded. The amplitude of deformation sweep ranges from 0.1 to 50% (outward cycle) then from 50% to 1% (return cycle). The results exploited are the complex dynamic shear modulus ($G^*$) and the loss factor ($\tan \delta$). On return cycle, the maximum observed value of $\tan \delta$ ($\tan(\delta)_{max}$) and the difference in complex modulus ($\Delta G^*$) between the values of 0.1% and at 50% deformation (the Payne effect) are indicated.

The difference between the $\tan \delta$ values for the first composition (cap) and for the second composition (base) is at least equal to 0.05. For preference, this difference is at least equal to 0.15.

The measures described here in the present description apply to the scenario in which the cap is itself formed of the superposition of at least two layers of compositions that differ notably in terms of their hysteresis. In such cases, it is considered that the hysteresis of the material of which the base is made is lower than the lowest of the hysteresis of the compositions of the cap.

For preference, the volume occupied by the base in the inner half cap is greater than the volume occupied by the base in the outer half cap by at least 50% of the total volume of the base.

Advantageously, the tire according to the invention comprises a crown reinforcement of axial width Lt, this crown reinforcement having two ends, an outer end situated on the same side as the outer half cap and an inner end situated on the same side as the inner half cap and is such that the additional volume of base between the inner half cap and the outer half cap is located radially on the outside of and axially on each side of the inner end of the crown reinforcement situated on the same side as the inner half cap.

More preferably still, this additional volume of base on the inner half cap is positioned in such a way as to extend axially on each side of the inner end of the crown reinforcement and over a width equal to at least 15 mm on each side of this inner end.

Advantageously, the aforementioned features of the invention can be combined with a cap tread pattern that is asymmetric, namely of which the raised patterns are arranged differently on each side of the equatorial plane.

It is thus advantageous to plan for the tread pattern to give the cap greater mechanical stiffness on the half cap situated axially on the outside by comparison with the half cap situated axially on the inside and for this asymmetric design to be combined with a volume of base in the inner half cap which is greater than the volume occupied by the base in the outer half cap, the material of which the base is made being a rubber-based composition having a hysteresis lower than the hysteresis of the rubber-based material of which the cap is made.

In one particularly advantageous alternative form of the invention, the cap is provided with an asymmetric tread pattern design over at least a thickness equal to 30% of the total thickness E of the cap, so as to form an outer part of axial width LE and an inner part of axial width LI. In the present application, axial width means the dimension measured in a direction parallel to the axis of rotation of the tire. The outer part is intended to be positioned axially towards the outside of a vehicle when the tire is mounted on this vehicle and the inner part in the axial continuation of the outer part towards the inside of the said vehicle.

Moreover, the inner part and the outer part are separated by a groove of circumferential overall orientation, this groove intersecting the tread surface along two edge corners, an axially outer edge corner and an axially inner edge corner.

This cap is further such that:
the outer part of the cap comprising, in the circumferential direction, a plurality of stiff strips of circumferential width D11 (measured in the circumferential direction) and of axial width LE, and of flexible strips of circumferential width D12 and of axial width LE arranged in alternation (a flexible strip is flanked circumferentially by two stiff strips).

The stiff strips have no groove and/or cavity opening onto the tread surface in the new state and the flexible strips have grooves running around the entire circumferential width D12 of these strips. Stiff strips have a circumferential width D11 at least equal to 7% of the axial width LE of the outer part (1).

In the present description, a strip means a volumetric part substantially in the form of a parallelepiped of cap having a thickness equal to the thickness on which the tread pattern according to the invention is formed.

The circumferential width of a strip in the present description means the dimension of the strip as measured in the circumferential direction.

For preference, the axial width LE of the outer part (measured between an axial edge of the cap and the edge corner, the one closest to said edge, of the groove separating the outer part from the inner part of said cap) is at least equal to 40% of the total axial width W of the cap. This total axial width W corresponds to the maximum width of the footprint in the contact patch under the nominal conditions of use of the tire, this width being measured in the axial direction.

In combination with this tread pattern, the tire comprises a base extending axially and radially under all of the cap and radially to the outside of the crown reinforcement over a total width at least equal to the width of the crown reinforcement, the said base comprising an additional volume in the inner part of the cap, this base being formed of a composition that has a hysteresis lower than the hysteresis of the composition of which the cap is made.

More preferably still, the axial width LE of the outer part is at most equal to 80% of the total axial contact width W of the cap.

For preference, the circumferential width D11 of the stiff strips is at least equal to 15% of the axial width LE of the said stiff strips.

Such a tread pattern is created on the cap between the tread surface of the cap in the new state and over a depth at least equal to 30% of the total thickness of this cap. The thickness of a cap is equal to the thickness of material that is intended to be worn away during running until the tire provided with this cap has to be removed to be retreaded or removed for good. For preference, this depth is at least equal to 50% of the total thickness of the cap. Of course, this tread pattern may be created over the total thickness E of the cap.

Further features and advantages of the invention will emerge from the description given hereinafter with reference to the attached drawings which, by way of nonlimiting examples, show some embodiments of the subject matter of the invention.

DESCRIPTION OF THE FIGURES

To make the figures easier to interpret, the same reference signs have been used to describe alternative forms of the invention where these reference signs refer to elements of the same structural or functional nature.

Figure 1:
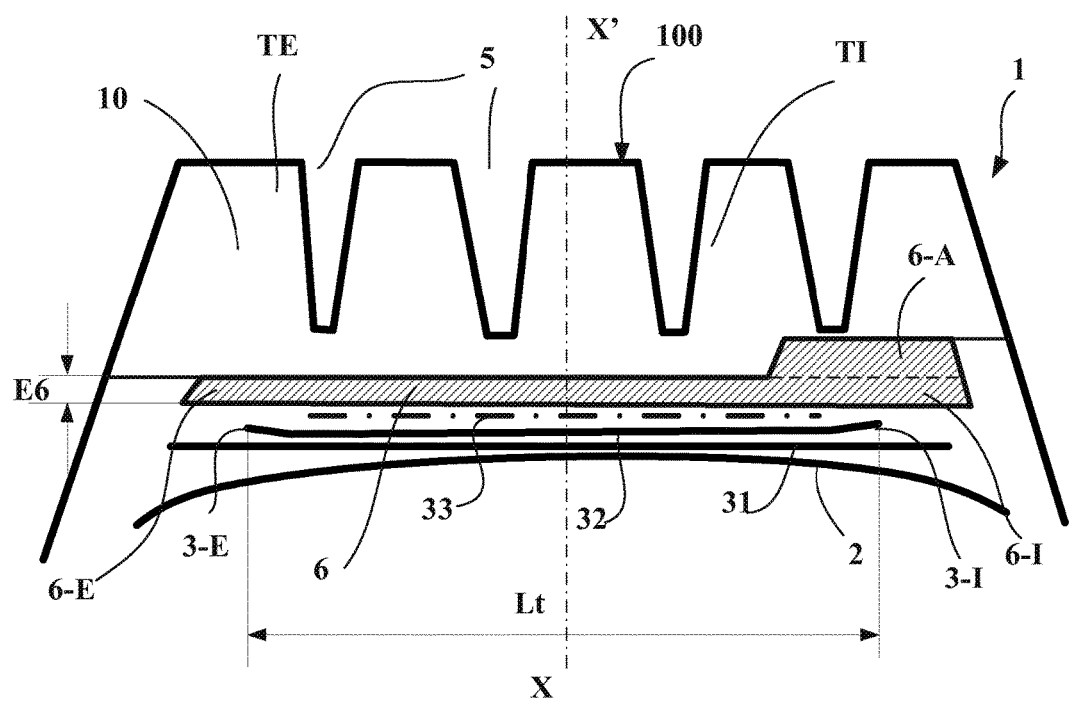
FIG. 1 depicts a partial view in cross section of a tire according to the invention.

FIG. 1 is a schematic view in cross section of part of a heavy vehicle tire 1 according to the invention to equip a vehicle of the trailer type. This tire 1 comprises a carcass reinforcement 2 extending between beads, not depicted here, this carcass reinforcement 2 being surmounted radially by a crown reinforcement 3, the latter reinforcement itself being surmounted by a cap 10.

The cap 10 comprises a tread surface 100 radially on the outside, this tread surface 100 being intended to come into contact with a road surface during driving on said roadway.

The crown reinforcement 3 comprises, in the instance depicted, two plies, referred to as working plies 31, 32, these working plies being formed within each ply with reinforcements that are mutually parallel, these reinforcements being crossed from one ply to the other. These working plies 31, 32 are intended to absorb the tensile loadings generated by the action of the internal tire inflation pressure. The crown reinforcement 3 is supplemented radially on the outside of the two working plies by a ply referred to as a protective ply 33, intended to protect the working plies against any external attack during driving. The working ply 32 furthest towards the outside here is the axially narrower of the two working plies and has a width Lt which defines the axial width of the crown reinforcement 3. The crown reinforcement 3 is continuous in the circumferential direction and has two axial ends 3-I and 3-E separated by this width Lt, the end 3-I being intended to lie on the axially inner side with respect to the equatorial plane (identified by its line XX' in this FIG. 1).

In the case depicted, the equatorial plane, identified by its straight line XX', divides the cap into two half caps: a first half cap TE intended to be positioned towards the outside of the trailer vehicle (this first half cap is referred to as the outer half cap) when the tire provided with this cap is mounted on a vehicle, and a second half cap TI intended to be positioned towards the inside of the same vehicle (this second half cap is referred to as the inner half cap).

This FIG. 1 shows the presence, radially on the outside of the crown reinforcement 3, of a base 6 extending axially over substantially the entire width of the first working ply 31, itself a little wider than the second working ply. This base 6 is positioned radially under the cap 10 which itself extends axially on each side of the base. The base 6 comprises a part 6-E situated axially on the outside with respect to the equatorial plane and a part 6-I axially on the inside with respect to that same equatorial plane. The base 6 situated at a substantially constant thickness E6 over practically its entire width with the exception of its part 6-I situated radially on the inside of the inner half cap TI. Specifically, in this part TI, the base 6 comprises an additional volume 6-A which is positioned in such a way as to extend axially on each side of the end 3-I of the second working ply. This additional volume 6-A replaces part of the volume of the cap 10.

Moreover, the value of the hysteresis of the rubber material of which the base 6 is formed is less than the value of the hysteresis of the material of which the cap 10 is formed.

This additional volume in the case depicted represents 30% of the total volume of the base.

Figure 2:
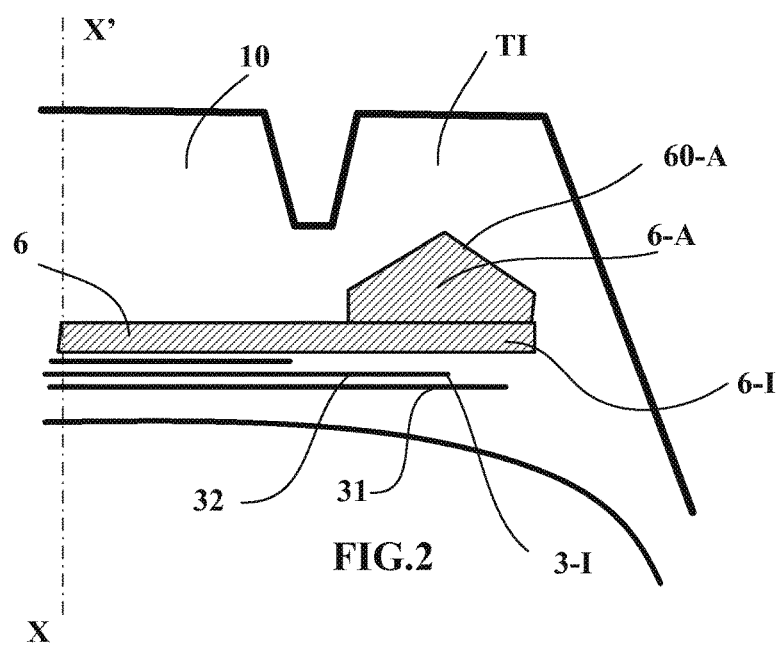
FIG. 2 depicts a view in cross section of an alternative form of the invention.

FIG. 2 is a view in cross section of the inside of another alternative form of tire 1 according to the invention, which differs from the alternative form shown in FIG. 1 in that the additional volume 6-A of the base 6 has a geometry radially on the outside 60-A which exhibits a height maximum located substantially in line with the end 3-I of the axially narrowest working ply 32 of the two working plies 31, 32.

Moreover, in this alternative form, the material of the additional volume 6-A of base is made of a different material from the material of the base, the purpose of this being further to enhance the beneficial effect from a thermal standpoint. This different material is chosen to be even lower in hysteresis than the base material extending on either side of the equatorial plane identified by its line XX' in this FIG. 2. Of course, the base and the additional volume of base may be made from the same material.

Figure 3:
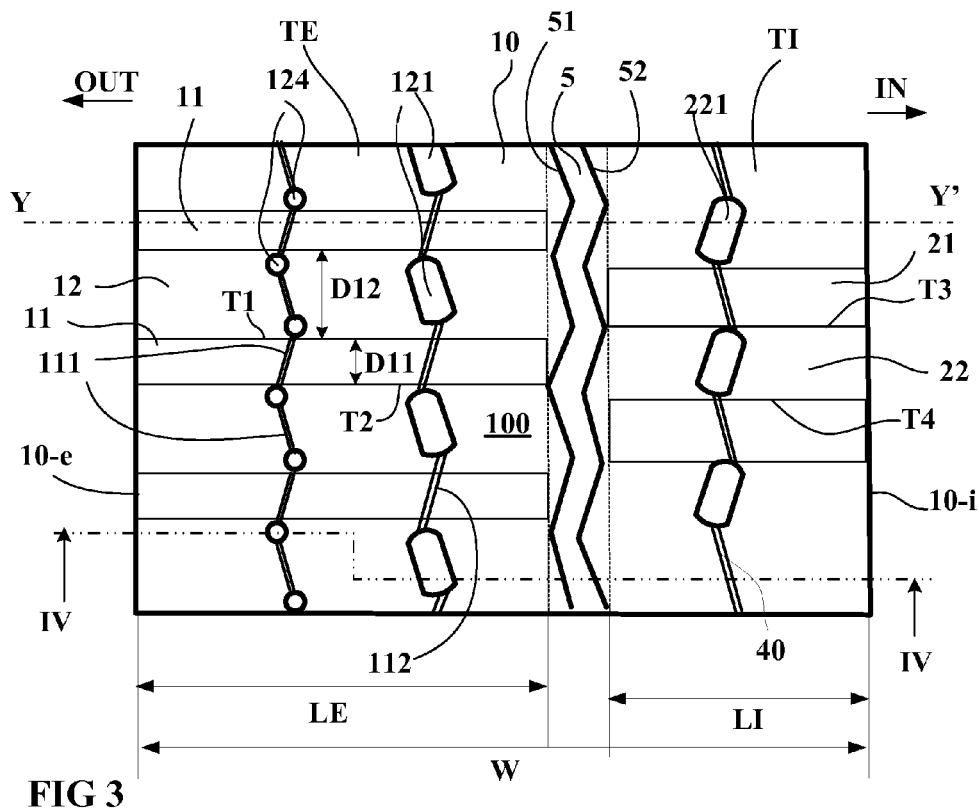
FIG. 3 depicts a view in cross section of an alternative form of tire comprising an asymmetric cap tread pattern.

FIG. 3 shows a view of the tread surface 100 of an alternative form of tire according to the invention, this tire comprising a cap 10 having an asymmetric tread pattern, which means to say a pattern that is different on each side of the equatorial plane. This tire is of the size 385/55 R22.5 and is intended to be fitted to an axle of a heavy vehicle trailer. This cap 10, in the new state, has a total width W of 320 mm (corresponding to the width of the footprint under nominal conditions of use of the tire) and comprises a single zigzag-shaped main groove 5 of circumferential orientation opening onto the tread surface 100 along two edge corners 51, 52, both having peaks and troughs. This main groove 5 has an average width of 13 mm (measured as the average distance separating the opposing walls that delimit this groove) and a depth of 15 mm. This main groove 5 divides the cap into two parts of different axial widths: an outer part TE of axial width LE intended to be positioned axially towards the outside of the vehicle, and an inner part TI of axial width LI intended to be positioned towards the inside of the vehicle. The axial width LI is sandwiched between an axially outer edge 10-*e* of the cap and the peaks of the edge corner 51 delimiting the circumferential groove 5, the said edge corner 51 corresponding to the edge corner situated axially furthest towards the outside once the tire is in position on a vehicle. This axial width LI is equal here to 190 mm (namely 60% of the total width W of the cap).

The inner part TI (situated on the inside identified by the arrow "IN") and the outer part TE (situated on the outer part identified by the arrow "OUT") are provided with voids or cavities 221 and 121 respectively, which have a width of 14 mm, measured on the tread surface 100 in the new state, and a maximum length of 34 mm. These cavities, which are 10 mm deep in this example, are also formed with a uniform mean clearance angle of 16.5° so as progressively to reduce the cross-sectional area of each cavity opening onto the tread surface as the cap gradually wears down. Further, the outer part TE comprises a plurality of wells 124 of the same depth as the cavities 121, these wells being positioned in the circumferential direction in such a way that, in combination with the cavities 121, they form flexible strips and stiff strips. These wells 124 have a conical shape and are connected to a circumferential passage 71 visible in FIG. 5, formed under the tread surface, this passage 71 being intended to form a new groove when the cap is partially worn away. The cavities 121 are extended radially on the inside by a circumferentially directed passage 72.

A stiff strip here means that under the action of the transverse loadings of the ground on the cap under cornering or when making a turn, the circumferentially directed sipes are closed up or close up very rapidly to generate a near-continuous and therefore maximum-stiffness cap. Conversely, the strips comprising the cavities are said to be flexible because, under the action of transverse loading, the apparent stiffness of these strips is dependent on the extent to which these cavities close up, and in any event is far lower than that of the stiff strips.

Straight lines T1 and T2 parallel to the axial direction (indicated in the figure by the axis YY') and tangential to the cavities 121 or to the wells 124 delimit stiff strips 11 having no cavities and wells and flexible strips 12 which do have cavities and wells.

The flexible strips 12 and the stiff strips 11 of the outer part of the cap are also provided with a sipe 112 that runs in zigzag shapes in the circumferential direction to connect the cavities 121. This sipe 112 is of a suitable width that it can close up again starting from the tread surface and over a great depth (which means to say at least 30% of the thickness of the cap) as it enters the contact patch where the tire makes contact with the road surface, so as to bring its opposing walls into contact with one another and thus obtain greater stiffness for the stiff strips 11. Axially on the outside of this sipe, the presence of another zigzag sipe 111 may be noted, this sipe joining together the plurality of wells 124 formed radially in the depth of the cap.

Everything is as if these sipes 111 and 112 had practically no effect on the transverse stiffnesses of each stiff strip and of each flexible strip when these sipes close up as they go through the contact patch during running. Thus, it is possible to enjoy the presence of additional edge corners without altering the stiffnesses of the flexible strips and of the stiff strips. Under cornering that could generate a phenomenon of side slip on the roadway, the transverse contact loadings applied by the roadway to the cap are, to a large extent, transmitted via the stiff strips 11, as the sipes 111 and 112 have closed up on themselves.

Each flexible strip has a circumferential width D12 equal to 40 mm. Each stiff strip has a circumferential width D11 equal to 25 mm (namely 13% of the axial width LE of the outer part). Under the nominal conditions as defined by the E.T.R.T.O. standard for this tire (a pressure of 9 bar, loading of 4400 daN), the footprint has a length of 155 mm in the circumferential direction. For preference, there are always at least two stiff strips in the contact patch in order to withstand the transverse loadings, and at least two flexible strips, which means a suitable number of cavities acting as a reservoir to pick up the water present on the roadway in rainy weather.

The presence of a zigzag sipe 40 directed in the circumferential overall direction may be noted on the inner part TI of axial width LI. This sipe 40 is situated substantially midway between the axially inner edge 10-*i* of the cap and the edge corner 52 of the groove 5. This sipe connects a plurality of cavities 221. This sipe 40 is able, on account of its dimensions, to close up as it enters the contact patch during running. The cavities 221 of the inner part 2 are circumferentially offset from the cavities 121 of the outer part 1. Thus, a succession of stiff strips 21 of circumferential width D21 and of flexible strips 22 of circumferential width D22 are formed on the inner part 2, these parts being delimited by straight lines T3 and T4 parallel to the axial direction YY' and tangential to the cavities 221. These stiff and flexible strips of the inner part 2 are arranged in alternation and in such a way as to be circumferentially offset from the stiff 11 and flexible 12 strips of the outer part 1.

Aside from the advantage when making turns, the tread pattern according to the invention makes it possible to reduce the void volumes present in the cap in the initial state and therefore to reduce appreciably the thickness of the cap for a predetermined overall volume.

In this alternative form, the volumes of voids and wells are distributed over the outer part TE in such a way that these volumes increase from the axially outermost edge of the cap towards the other edge of the outer part TE to reach a maximum at the circumferential groove 5. The same is true but in the opposite direction for the inner part TI starting from the axially innermost edge with respect to the vehicle and progressing towards the circumferential groove.

In this instance, the sipe 111 is situated a mean distance of 64 mm (namely 20% of the width W=320 mm) away from the outer edge 10-*e* of the cap 10.

In order to obtain a performance that is lasting in spite of wear, a second part is provided, after a first asymmetric tread pattern part, in the thickness of the cap which is not entirely asymmetric. This second part becomes active in the contact patch once the cap has become partially worn.

Figure 4:
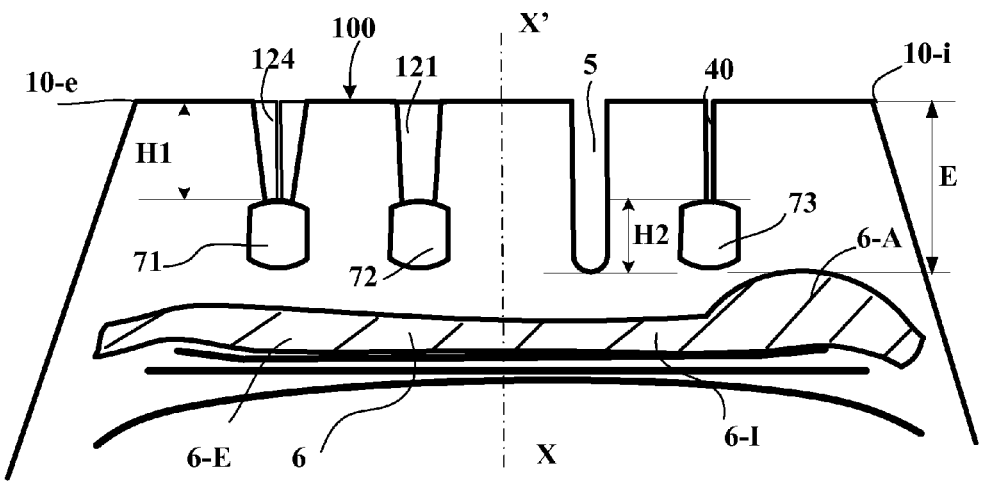
FIG. 4 depicts a view in a plane of section identified by the line IV-IV in FIG. 3.

FIG. 4, which shows the cap of FIG. 3 viewed in cross section on a radial plane the line of which follows the line IV-IV in FIG. 3, shows, after a depth H1 corresponding to the depth of the cavities 121, 221 and to the depth of the wells 124, the formation of passages 71, 72, 73 which open onto the tread surface after partial wear corresponding to the depth H1, here equal to 10 mm, thereby forming three new grooves directed circumferentially and of depth H2, equal to 5 mm. In this alternative form, the tread pattern according to the invention is present and active over a thickness H1 which here is substantially equal to 66% of the total thickness of 15 mm of material that can be worn away.

Further, the tire described comprises a crown reinforcement comprising two working plies radially on the outside of a carcass reinforcement. Between the radially outermost crown ply and the cap that has just been described, there is a base of rubber 6 made of a rubber material having a tan δ value equal to 0.04 measured under the conditions of 60° C. and 10 Hz and 10% deformation. Under the same measurement conditions, the cap is made of a material that has a tan δ value of 0.12.

It will be noted that the base comprises an additional volume 6-A positioned radially between the cap and the axially inner part 6-I of the base (the latter being intended to be situated on the axially inner side TI of the cap).

The difference in volume of base between the inside 6-I and the outside 6-E is equal to 0.2 dm³, namely around 55% of the total volume of the base equal to 0.55 dm³. It is preferable for this difference to be limited to 150% for applications for tires for heavy vehicles of the trailer type.

In this case, as in that shown in FIG. 1, the cap is intended to be worn away during driving down to a depth which does not reach the additional volume of base.

This combination of a base comprising an additional volume of material of lower hysteresis on the axially inner side TI with the asymmetric tread pattern described specifically in relation to FIG. 4 gives the tires intended to be fitted to a multiple-axle heavy vehicle trailer makes it possible surprisingly to achieve an appreciable improvement in the resistance to damage near the edge of the crown reinforcement situated axially on the inside of the tire.

Of course, the invention is not restricted to the examples described and depicted and various modifications can be made thereto without departing from the scope defined by the claims. In particular, any combination of the various alternative forms proposed here forms part of the scope of the invention.

The invention claimed is:

1. A tire intended to be fitted to a heavy vehicle of the trailer type, this tire comprising a carcass reinforcement surmounted radially on the outside by a crown reinforcement comprising at least two working plies, the width Lt of this crown reinforcement being equal to the width of the axially narrowest working ply, this crown reinforcement being surmounted radially on the outside by a tread (also known as a "cap") and interposed radially between the said cap and the crown reinforcement by a sublayer (also known as a "base"), this base extending axially and radially under all of the cap and radially on the outside of the crown reinforcement over a total width at least equal to the width Lt of the crown reinforcement, an equatorial plane dividing the cap axially into an outer half cap (TE) and an inner half cap (TI) of the same axial width, the outer half cap (TE) being intended to be positioned axially towards the outside of a vehicle and the inner half cap (TI) being intended to be positioned axially towards the inside of the vehicle, the cap having a thickness E, a tread surface intended to come into contact with a roadway and being provided in the new state with an asymmetric tread pattern over at least a thickness equal to 30% of the thickness E of the cap, this tread pattern conferring greater mechanical stiffness on the outer half cap (TE) by comparison with the inner half cap (TI), this tire wherein:

the base comprises an additional volume positioned radially under the inner half cap (TI), this additional volume being such that the volume occupied by the base radially under the inner half cap (TI) is greater than the volume occupied by the base radially under the outer half cap (TE), and in that the material of which the base is made is a rubber-based composition having hysteresis lower than the hysteresis of the rubber-based material of which the cap is made, and wherein the inner half cap (TI) and the outer half cap (TE) are separated by a groove of circumferential overall orientation, this groove intersecting the tread surface along two edge corners, an axially outer edge corner and an axially inner edge corner, the outer half cap (TE) includes in the circumferential direction, a succession of stiff strips of circumferential width D11 and of axial width LE and of flexible strips of circumferential width D12 and of axial width LE which have grooves extending over the entire circumferential width D12 of these flexible strips, and the stiff strips and flexible strips extend tangential to a same direction of a circumferential direction of the tire, and the succession of stiff strips and the flexible strips are not continued into the inner half and, the stiff strips and the flexible strips both define a portion with at least one sipe that extends in the circumferential direction of the tire, and the at least one sipe for the stiff strips is configured to close up at a quicker rate than the at least one sipe for the flexible strips, in response to transverse loading, wherein the base has a first portion and second portion, wherein the first portion extends equidistantly into the inner half cap and the outer half cap from the equatorial plane, and the second portion only extends within the inner half cap, wherein the first portion and second portion are different types of rubber.

2. The tire according to claim 1, wherein the volume occupied by the base in the inner half cap (TI) is greater than the volume occupied by the base in the outer half cap (TE) by at least 50% of the total volume of the base.

3. The tire according to claim 1, wherein the difference in hysteresis of the composition of which the cap is made and the composition of which the base is made, this difference in hysteresis being expressed as the difference between the tan δ values for the said compositions, is at least equal to 0.05 under the measurement conditions defined according to standard ASTM D 5992-96.

4. The tire according to claim 1, wherein the difference between the tan δ value for the composition of which the cap is made and that of the composition from which the base is made is at least equal to 0.15 under the measurement conditions defined according to standard ASTM D 5992-96.

5. The tire according to claim 1, wherein the additional volume of base between the inside (TI) and the outside (TE) is located radially on the outside of and axially on each side of the end of an axially narrowest working ply that is situated on the inside of the cap.

6. The tire according to claim 5, wherein this additional volume of base on the inner half cap (TI) is positioned in such a way as to extend axially on each side of the inner end of an axially narrowest working ply and over a width equal to at least 15 mm on each side of this inner end.

7. The tire according to claim 1, wherein each of the succession of stiff strips and each of the flexible strips are provided in an alternating fashion.

8. The tire according to claim 7, wherein the succession of stiff strips are spaced so that at least two of the stiff strips make contact with a road during driving conditions.

9. The tire according to claim 1, wherein the inner half cap (TI) has a plurality of stiff strips and flexible strips, and the plurality of stiff strips and flexible strips in the inner half cap (TI) are independent the succession of stiff strips and flexible strips of the outer half cap (TE).

10. The tire according to claim 9, wherein an alternation of the inner half cap plurality of stiff strips and plurality of flexible strips, and the alternation of the outer half cap plurality of stiff strips and plurality of flexible strips, are opposite of each other.

11. The tire according to claim 1, wherein the second portion is of a rubber with lower hysteresis than the first portion's rubber.

\* \* \* \* \*